United States Patent [19]

Stehouwer

[11] 4,407,082

[45] Oct. 4, 1983

[54] TAG

[75] Inventor: William J. Stehouwer, Lansing, Mich.

[73] Assignee: A. J. Sparks, Grand Rapids, Mich.

[21] Appl. No.: 320,939

[22] Filed: Nov. 13, 1981

[51] Int. Cl.[3] .......................... G09F 3/18; A44C 3/00; B65D 77/10; B32K 1/06

[52] U.S. Cl. .................................... 40/10 C; 40/2 R; 40/316; 40/21 R; 24/16 PB; 24/30.5 T; 24/30.5 R; 228/1 A

[58] Field of Search .......... 24/30.5 T, 30.5 R, 30.5 P; 40/306, 10 C, 10 R, 307, 316, 21 R, 2 R, 21 A, 21 B, 21 C; 116/278; 156/73.1, 73.2, 73.4; 228/1 R, 1 A, 1 B

[56] References Cited

U.S. PATENT DOCUMENTS

| | | | |
|---|---|---|---|
| 2,973,597 | 3/1961 | Powell | 24/30.5 T |
| 3,290,854 | 12/1966 | MacMurray | 24/30.5 T |
| 3,311,288 | 3/1967 | Lemelson | 24/30.5 T |
| 3,409,948 | 11/1968 | Goodwin | 24/30.5 T |
| 3,677,250 | 7/1972 | Thomas | 24/DIG. 11 |
| 3,909,979 | 10/1975 | Perez | 24/30.5 T |
| 4,169,751 | 10/1979 | Yen | 156/73.1 |
| 4,208,001 | 6/1980 | Martner | 156/73.1 |

*Primary Examiner*—Robert Peshock
*Assistant Examiner*—Michael J. Foycik
*Attorney, Agent, or Firm*—Price, Heneveld, Huizenga & Cooper

[57] ABSTRACT

A tag has a body carrying printed indicia and a tie extending from an edge of the body and having a flexible wire core surrounded by a resilient polymeric material. The tie is bonded to the body by ultrasonic welding to provide an integral construction which assures the body of the tag will not be separated from the tie once attached to an object. Such construction permits the tag to be attached to nursery stock for example, by wrapping the embedded wire tie around a branch.

18 Claims, 5 Drawing Figures

TAG

BACKGROUND OF THE INVENTION

The present invention relates to a tag and more particularly to an improved attachment means therefor.

Existing tags and particularly tags used in connection with nursery stock in an outdoor environment are subject to ripping and tearing under high wind conditions encountered when tags are exposed to the environment. The problem is particularly severe when the body of the tag is relatively large and offers considerable wind resistance. Further, existing tags are frequently difficult to attach to nursery stock where, typically, protective gloves are worn by employees attaching tags, particularly during severe weather conditions.

SUMMARY OF THE PRESENT INVENTION

The tag of the present invention provides a body carrying printed indicia thereon and a tie extending from an edge of the body and having a flexible wire core surrounded by a resilient polymeric material. Such construction permits the tag to be attached to nursery stock simply by wrapping the embedded wire tie around a branch or the like to hold the tag to the object.

The present invention also contemplates a unique method for bonding a body and tie together to provide an integral construction which assures the body of the tag will not be separated from the tie during movement of the article to which the tag is attached or in the case of nursery stock, during severe weather conditions. In the preferred method of the invention the tie is ultrasonicly welded to the body of the tag employing a perdetermined welding pattern, pressure and power to assure bonding of the two members.

These and other features, advantages and objects of the present invention will become apparent upon reading the following description thereof together with reference to the accompanying drawings in which:

BRIEF DESCRIPTION OF THE DRAWINGS

FIG. 2 illustrates one manner in which the tag shown in FIG. 1 can be attached to a branch or the like;

DETAILED DESCRIPTION OF THE PREFERRED EMBODIMENT

Figure 1:
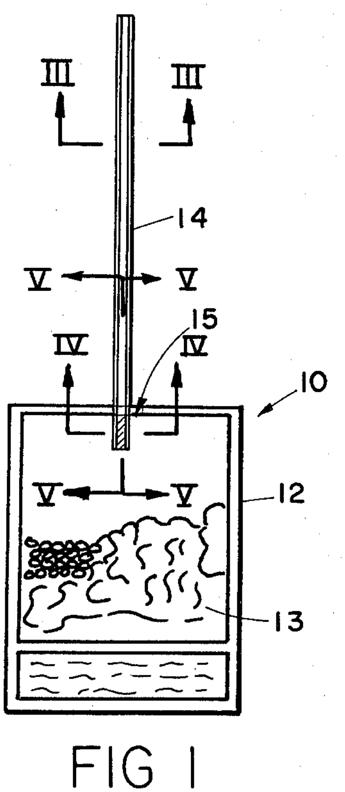
FIG. 1 is a plan view of a tag embodying the present invention.

Referring initially to FIG. 1 there is shown a plant tag 10 embodying the present invention and which includes a body 12 of generally rectangular shape. Attached to body 12, as an integral part thereof, by a bonding process described below, is a tie 14 extending centrally and orthogonally from one edge of body 12. The tie 14 and body 12 are made of a polymeric material such as a polyolefin and in the preferred embodiment commercially available STACON was employed. As can be seen in FIG. 1, the body 12 carries printed indicia thereon such as planting and plant care information when the tags are employed with nursery stock for which they are uniquely suited. In one embodiment of the invention, body 12 had a dimension of 3 inches by 4 inches with the tie 14 exending outwardly therefrom approximately 5 inches and overlaps and is bonded to the body over a $\frac{3}{8}$ of an inch junction 15 between tie 14 and body 12.

Figure 3:
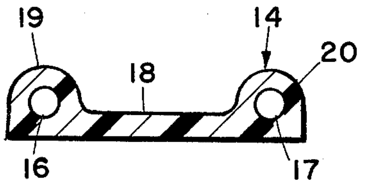
FIG. 3 is an enlarged cross-sectional view taken along section line III—III of FIG. 1.

As best seen in FIG. 3, tie 14 comprises at least one and preferably a pair of spaced apart wires 16 and 17 extending parallel to one another and embedded within the polymeric material by an extrusion process. An interconnecting web or bridge 18 extends between wires 16 and 17 with the wires being surrounded by raised edge portions 19 and 20 such that the wires are totally surrounded by the polymeric material forming the tie. In the preferred embodiment of the invention, the width of the tie was approximately 0.22 inches and the center-to-center spacing of the wires was approximately 0.16 inches. The thickness of web 18 is the same as the thickness of body 12 and in the preferred embodiment of the invention fell within the range of 0.012 to 0.015 inches.

Figure 4:
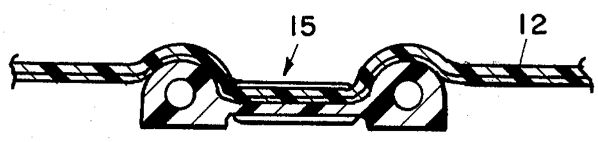
FIG. 4 is an enlarged fragmentary cross-sectional view taken along section line IV—IV of FIG. 1.
Figure 5:
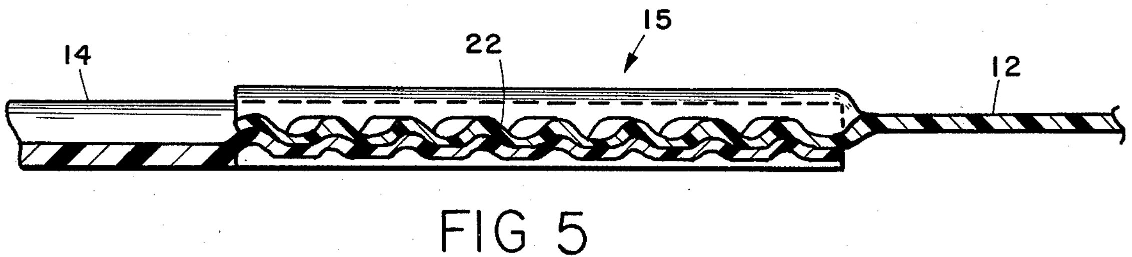
FIG. 5 is an enlarged fragmentary cross-sectional view taken along section line V—V of FIG. 1.

The junction or bond 15 between tie 14 and body 12 is accomplished in the preferred embodiment by a ultrasonic welding process, the results of which can best be seen by reference to FIGS. 1, 4 and 5. The tie 14 is extruded with the wires 16 and 17 embedded therein and subsequently cut in lengths for bonding to the tag bodies stamped from a sheet of material after the indicia is printed thereon. The tie and body are held in an aligned position, as shown in FIG. 1, and welding electrodes providing a diagonal pattern of parallel channels 22, as best seen in FIG. 5, impresses tie 14 to body 12 at a pressure approximately 296 PSI. The skew angle for eight of the $\frac{1}{8}$ inch width rounded channels 22 having approximately $\frac{1}{2}$ inch length and spaced apart from one another 0.060 inches is 25° to maximize the bonding area between the tie 14 and body 12. The welding frequency is approximately 20 kHz utilizing 400 watts and the application time is from 0.6 to 0.8 seconds with a total welding cycle being approximately 1.2 seconds. It is important with respect to this process that the parallel, diagonally skewed channels 22 are employed to maximize the contact area between time 14 and body 12 and that the thickness of web 18 is substantially the same as body 12 to assure bonding between tie 14 and body 12 such that when applied to a branch or the like, as shown in FIG. 2, the body cannot be separated from the tie.

Figure 2:
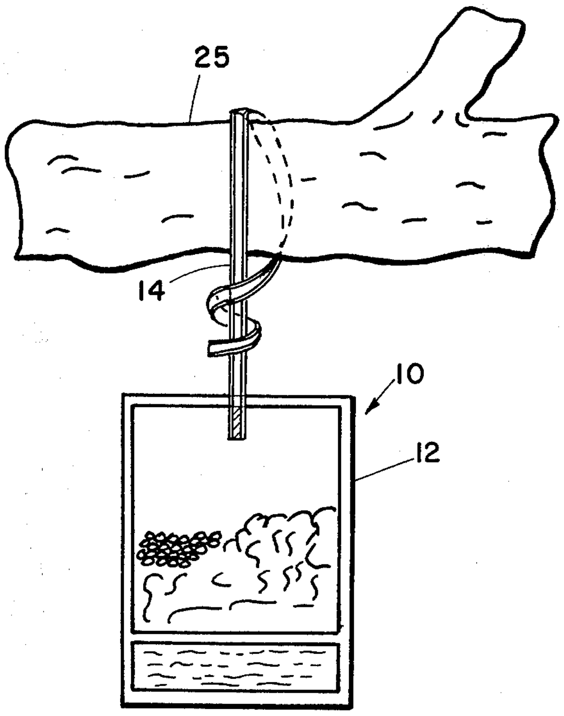

As illustrated in FIG. 2, the tag can be easily attached to a branch 25 or the like by wrapping tie 14 therearound and either back on itself, as illustrated, or around the branch an additional time depending on the diameter of the object to which the tag is being applied. The memory wire 16 and 17 is approximately 23 guage and once deformed will retain its deformed position for securing a tag to an object.

By employing a tie 14 utilizing an embedded, flexible wire which is integrally bonded to the tag body, a tag can be readily attached to a branch of nursery stock with a minimum of dexterity being required. Thus, tags can be applied where the employee is wearing protective gloves either for protection against evergreen nursery stock or weather conditions. Inasmuch as the material forming the tie 14 is identical to that of body 12 and is bonded thereto, the tie 14 becomes an integral part of the body and cannot be separated once welded according to the process of the present invention.

It will become apparent to those skilled in the art that various modifications to the preferred embodiment of the invention can be made. In some applications, for example, a single embedded wire may be employed within the tie. The specific demensions of the tag also can be varied as can its overall shape. These and other modifications to the preferred embodiment may, however, fall within the spirit or scope as defined by the appended claims.

The embodiments of the invention in which an exclusive property or privilege is claimed are defined as follows:

1. A nursery tag comprising:

a polymeric body for carrying indicia thereon; and a tie extending centrally from an edge of said body and having an end overlapping a relatively small portion of said body, said tie having a flexible wire core surrounded by a resilient polymeric material, said tie integrally ultrasonically bonded to said body in the overlying portion of said body and tie.

2. The apparatus as defined in claim 1 wherein said tie includes a pair of spaced apart wires surrounded by said resilient material.

3. The apparatus as defined in claim 2 wherein said tie and body are made of the same polymeric material.

4. The apparatus as defined in claim 3 wherein said tie includes a web extending between said wires.

5. The apparatus as defined in claim 4 wherein said web has a thickness substantially the same as the thickness of said body.

6. The apparatus as defined in claim 1 wherein said overlying portion of said tie and body includes a plurality of parallel spaced apart channels formed in said tie and body.

7. The apparatus as defined in claim 6 wherein said tie includes a pair of spaced apart wires defining a web therebetween and said channels are formed in said web at a predetermined skew angle.

8. The apparatus as defined in claim 7 wherein said plurality of parallel channels extending between said wires and said web are skewed at an acute angle.

9. The apparatus as defined in claim 8 wherein said body is rectangular.

10. A method of bonding a tie including a wire surrounded by a polymeric material to a sheet of polymeric material to form a nursery tag comprising the steps of:

positioning the tie with respect to the body in overlapping relationship;

engaging the overlapped area between the tie and body with welding electrodes having a plurality of diagonally extending contact lines; and applying ultrasonic frequency energy to the junction of the tie and body to bond the tie to the body.

11. The method as defined in claim 10 wherein said engaging step provides rounded channels of contact between the tie and body which are about $\frac{1}{8}$ of an inch in width.

12. The method as defined in claim 11 wherein said applying step includes applying 20 kHz energy to the junction at a power level of about 400 watts for a period of about 0.7 seconds.

13. A nursery tag comprising:

a generally rectangular body made of a thin polymeric material, said body of sufficient size to carry plant identification and care information thereon; and a separate tie extending centrally from an edge of said body and extending in alignment with the centerline of said body and overlapping said body a distance significantly less than the centerline length dimension of said body, said tie including at least one flexible wire core surrounded by a resilient polymeric material and means for integrally bonding said tie to said body, said bonding means including a plurality of spaced aligned ultrasonically formed channels extended in said body and tie in the region of overlap of said tie and body to securely attach said tie to said body.

14. The apparatus as defined in claim 13 wherein said tie includes a pair of spaced apart wires surrounded by said resilient material.

15. The apparatus as defined in claim 14 wherein said tie and body are made of the same polymeric material.

16. The apparatus as defined in claim 15 wherein said channels extend diagonally with respect to the axis of said tie and between said pair of wires.

17. The apparatus as defined in claim 16 wherein said tie has a thickness between said wires which is substantially the same as the thickness of said body.

18. The apparatus as defined in claim 17 wherein said channels are in parallel spaced relationship to one another.

* * * * *

UNITED STATES PATENT AND TRADEMARK OFFICE

CERTIFICATE OF CORRECTION

PATENT NO. : 4,407,082

DATED : October 4, 1983

INVENTOR(S) : William J. Stehouwer

It is certified that error appears in the above—identified patent and that said Letters Patent is hereby corrected as shown below:

Assignee should be --A. J. Sparks & Company--

Column 1, lines 32 & 33:
"ultrasonicly" should be --ultrasonically--

Column 1, line 33 & 34:
"perdetermined" should be --predetermined--

Column 2, line 21:
"a" should be --an--

Column 2, line 41:
"time 14" should be --tie 14--

Column 2, line 53:
"guage" should be --gauge--

Column 3, line 3:
"demensions" should be --dimensions--

Signed and Sealed this

*Tenth* Day of *April 1984*

[SEAL]

*Attest:*

GERALD J. MOSSINGHOFF

*Attesting Officer* *Commissioner of Patents and Trademarks*